United States Patent
Gilbert-Eyres et al.

(10) Patent No.: US 12,454,246 B2
(45) Date of Patent: Oct. 28, 2025

(54) SYSTEM AND METHOD FOR AUTOMATIC SECURE VEHICLE VIA WIRELESS CONNECTIVITY AND LOCAL EVENTS

(71) Applicant: GM GLOBAL TECHNOLOGY OPERATIONS LLC, Detroit, MI (US)

(72) Inventors: Matthew E. Gilbert-Eyres, Rochester Hills, MI (US); Eric T. Hosey, Rochester Hills, MI (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 196 days.

(21) Appl. No.: 18/327,189

(22) Filed: Jun. 1, 2023

(65) Prior Publication Data
US 2024/0399998 A1   Dec. 5, 2024

(51) Int. Cl.
*B60R 25/24* (2013.01)
*B60R 25/04* (2013.01)
*B60W 60/00* (2020.01)

(52) U.S. Cl.
CPC ............. *B60R 25/24* (2013.01); *B60R 25/04* (2013.01); *B60W 60/0016* (2020.02); *B60W 2556/45* (2020.02)

(58) Field of Classification Search
CPC ......... B60R 25/24; B60R 25/04; B60R 25/01; B60R 25/10; B60R 25/102
See application file for complete search history.

(56) References Cited

U.S. PATENT DOCUMENTS

| | | | |
|---|---|---|---|
| 9,919,704 B1* | 3/2018 | Kundu | H04N 13/243 |
| 11,007,979 B1* | 5/2021 | Mitchell | B60R 25/33 |
| 2012/0065858 A1* | 3/2012 | Nickolaou | B60Q 9/008 |
| | | | 701/1 |
| 2013/0158857 A1* | 6/2013 | Dutta | G01S 19/34 |
| | | | 701/408 |
| 2019/0202463 A1* | 7/2019 | Anderson | B60W 30/06 |
| 2019/0210567 A1* | 7/2019 | Frederick | G05D 1/0088 |
| 2022/0153227 A1* | 5/2022 | Srivastava | B60R 25/31 |
| 2022/0410839 A1* | 12/2022 | Weston | B60R 25/245 |
| 2023/0093927 A1* | 3/2023 | Singh | G06F 3/167 |
| | | | 340/457 |
| 2023/0294713 A1* | 9/2023 | Pesa | B60H 1/00785 |
| | | | 701/36 |

* cited by examiner

*Primary Examiner* — Tan Q Nguyen
(74) *Attorney, Agent, or Firm* — Quinn IP Law

(57) ABSTRACT

Methods of securing a vehicle, via controller, include monitoring local events; determining whether the vehicle is parked in a dangerous area; and taking corrective action to protect the vehicle. Methods may include determining whether local events have occurred within a prescribed distance and, if the local events have occurred within the prescribed distance, arming the vehicle. Methods may include determining whether valuable items have been left in view and notifying a user of the vehicle if valuable items have been left in view via wireless communications. Methods may include locking vehicle doors and monitoring external and internal data or self-driving the vehicle to a safer area. Furthermore, if the methods determine that a theft is occurring on the vehicle, using nearby self-driving vehicles to block the vehicle in, which may be reached via V2X or a back office asking the nearby vehicles to block the vehicle.

20 Claims, 4 Drawing Sheets

SYSTEM AND METHOD FOR AUTOMATIC SECURE VEHICLE VIA WIRELESS CONNECTIVITY AND LOCAL EVENTS

INTRODUCTION

The present disclosure relates to systems and methods for automatically securing vehicle via wireless connectivity and local events. The systems use sensors to determine whether there are any possible issues with theft or other troubling events. Currently no technologies exist to help secure vehicles that are detected to be in danger of theft or damage.

SUMMARY

A method, or methods, of securing a vehicle, which may be executed by a non-transitory computer-readable storage medium on which is recorded instructions, includes monitoring local events; determining whether the vehicle is parked in a dangerous area; and taking corrective action to protect the vehicle. The methods may further include determining whether the local events have occurred within a prescribed distance and, if the local events have occurred within the prescribed distance, arming a security feature of the vehicle.

The methods may further include determining whether valuable items have been left in view and notifying a user of the vehicle if valuable items have been left in view via wireless communications. The methods may further include locking the vehicle doors and monitoring external and internal data elements.

The methods may use V2X to communicate with nearby elements. The methods may include self-driving the vehicle to a safer area. Furthermore, if the methods determine that a theft is occurring on the vehicle, using nearby self-driving vehicles to block the vehicle in, which may be reached via V2X or a back office asking the nearby self-driving vehicles to block the vehicle in.

The above features and advantages and other features and advantages of the present disclosure are readily apparent from the following detailed description of the best modes for carrying out the disclosure when taken in connection with the accompanying drawings.

DETAILED DESCRIPTION

Figure 1:
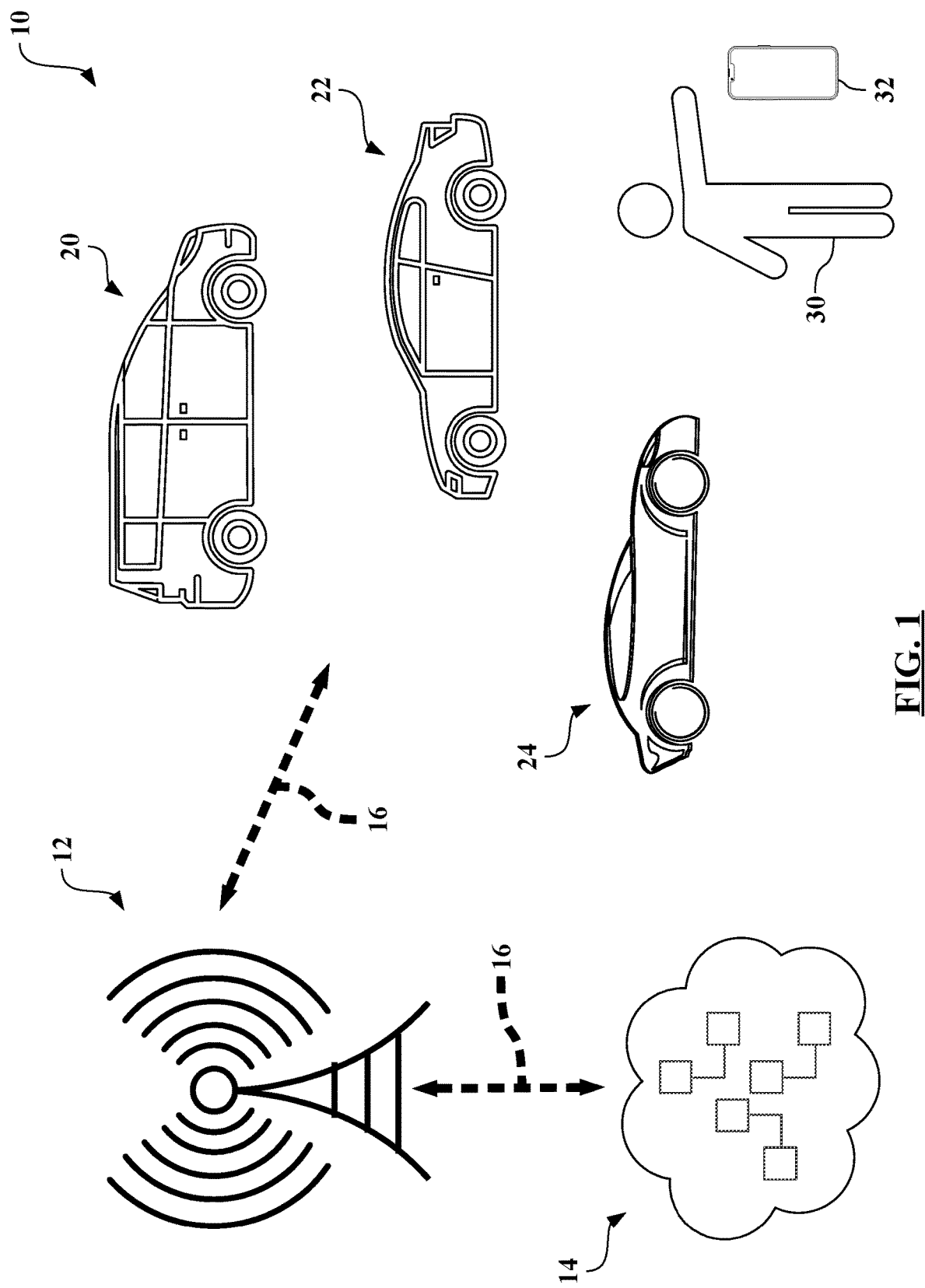
FIG. 1 is a schematic diagram of a connectivity system to automatically secure one or more vehicles via wireless connectivity and local events.

Referring to the drawings, like reference numbers refer to similar components, wherever possible. FIG. 1 schematically illustrates a connectivity network or connectivity system 10. The connectivity system 10 includes numerous components, only some of which are listed herein. A remote or cellular communications system, or cellular network 12, which may be representative of many types of communications protocols, including, without limitation: cellular, satellite, Wi-Fi, Bluetooth, ultra-wideband (UWB) or other communications recognizable to those having ordinary skill in the art. UWB is a radio-based communication technology for short-range use and fast and stable transmission of data.

A centralized location 14 is shown highly schematically, but may be representative of many different structures, clouds, servers, or elements, as will be recognized by skilled artisans. The centralized location 14 represents systems that communicate with some, or all, of the other systems and/or objects described herein. The centralized location 14 includes numerous controllers. Additionally, the centralized location 14 may be a back office (BO) of the manufacturer of one or more vehicles.

Several transfer protocols or transfers 16 are schematically illustrated. These transfers 16 may include, without limitation: cellular, Wi-Fi, wired networks, over-the-air (OTA), other transport protocols, including machine to machine (M2M), or other telematics equipment, or other systems recognizable by those having ordinary skill in the art. M2M systems use point-to-point communications between machines, sensors, and hardware over cellular, Wi-Fi, or wired networks.

The drawings and figures presented herein are diagrams, are not to scale, and are provided purely for descriptive purposes. Thus, any specific or relative dimensions or alignments shown in the drawings are not to be construed as limiting. While the disclosure may be illustrated with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The term vehicle is broadly applied to any moving platform. Vehicles into which the disclosure may be incorporated include, for example and without limitation: passenger or freight vehicles; autonomous driving vehicles; industrial, construction, and mining equipment; and various types of aircraft.

All numerical values of parameters (e.g., of quantities or conditions) in this specification, including the appended claims, are to be understood as being modified in all instances by the term "about," whether or not the term actually appears before the numerical value. About indicates that the stated numerical value allows some slight imprecision (with some approach to exactness in the value; about or reasonably close to the value; nearly). If the imprecision provided by about is not otherwise understood in the art with this ordinary meaning, then about as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiments.

When used herein, the term "substantially" often refers to relationships that are ideally perfect or complete, but where manufacturing realities prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans will recognize the amount of acceptable variance. For example, and without limitation, coverages, areas, or distances may generally be within 10% of perfection for substantial equivalence. Similarly, relative alignments, such as parallel or perpendicular, may generally be considered to be within 5%.

A generalized control system, computing system, or controller is operatively in communication with relevant components of all systems, and recognizable by those having ordinary skill in the art. The controller includes, for example and without limitation, a non-generalized, electronic control device having a preprogrammed digital computer or processor, a memory, storage, or non-transitory computer-readable storage medium used to store data such as control logic, instructions, lookup tables, etc., and a plurality of input/output peripherals, ports, or communication protocols.

Furthermore, the controller may include, or be in communication with, a plurality of sensors. The controller is configured to execute or implement all control logic or instructions described herein and may be communicating with any sensors described herein or recognizable by skilled artisans. Any of the methods described herein may be executed by one or more controllers.

The connectivity system 10 may be used to execute methods of securing one or more vehicles 20, such as a first vehicle 20, a second vehicle 22, and/or a third vehicle 24. The methods may include monitoring local events and determining whether the first vehicle 20 is parked in a dangerous area. The controller may be a dedicated portion of the first vehicle 20 or may be part of other controllers, as will be recognized by those having ordinary skill in the art.

The monitored local events that are triggers for the methods, include, without limitation: high theft likelihood or civil unrest. Additionally, dangerous areas, include, without limitation: darkened areas, secluded areas, or high theft items left in cabin.

If local events are found or the first vehicle 20 is in a dangerous area, the methods may take corrective action to protect the first vehicle 20. Corrective actions may include, without limitation: arming—by increasing the security levels or security features—the first vehicle 20, self-driving the first vehicle 20 to a safer area, or using nearby self-driving vehicles 20 to block the first vehicle 20. Arming the first vehicle 20 may also include, without limitation: locking the first vehicle 20 doors and/or monitoring external and internal data elements.

Additionally, the methods may include determining whether the local events have occurred within a prescribed distance. Skilled artisans will recognize prescribed distances, based on the situations of the first vehicle 20 and specific to the local events triggering the methods.

The methods may include determining whether valuable items have been left in view. This may occur by scanning the interior of the first vehicle 20 with, without limitation, cameras, LIDAR/RADAR, or other perception elements. If valuable, or high theft likelihood, items are in view, notify a user 30 of the first vehicle 20 that valuable items have been left in view. Notification may include, without limitation, sending a text message to a smart device 32 or alerting an app on the smart device 32. Skilled artisans will recognized valuable items for which the methods may scan.

Smart devices 32 include, without limitation, web and/or cellular enabled smart phones or tablets, or others recognizable to skilled artisans. Smart device apps include numerous applications that run on smart devices 32, as will be recognized by skilled artisans. The smart device app may allow users to edit collected data for sensitive data and use smart devices 32 to enhance data for mapping and pattern recognition.

The methods may include self-driving the first vehicle 20 to a safer area. Safer areas may include, without limitation: better illuminated areas, areas lacking thefts, and/or areas lacking civil unrest.

Figure 2:
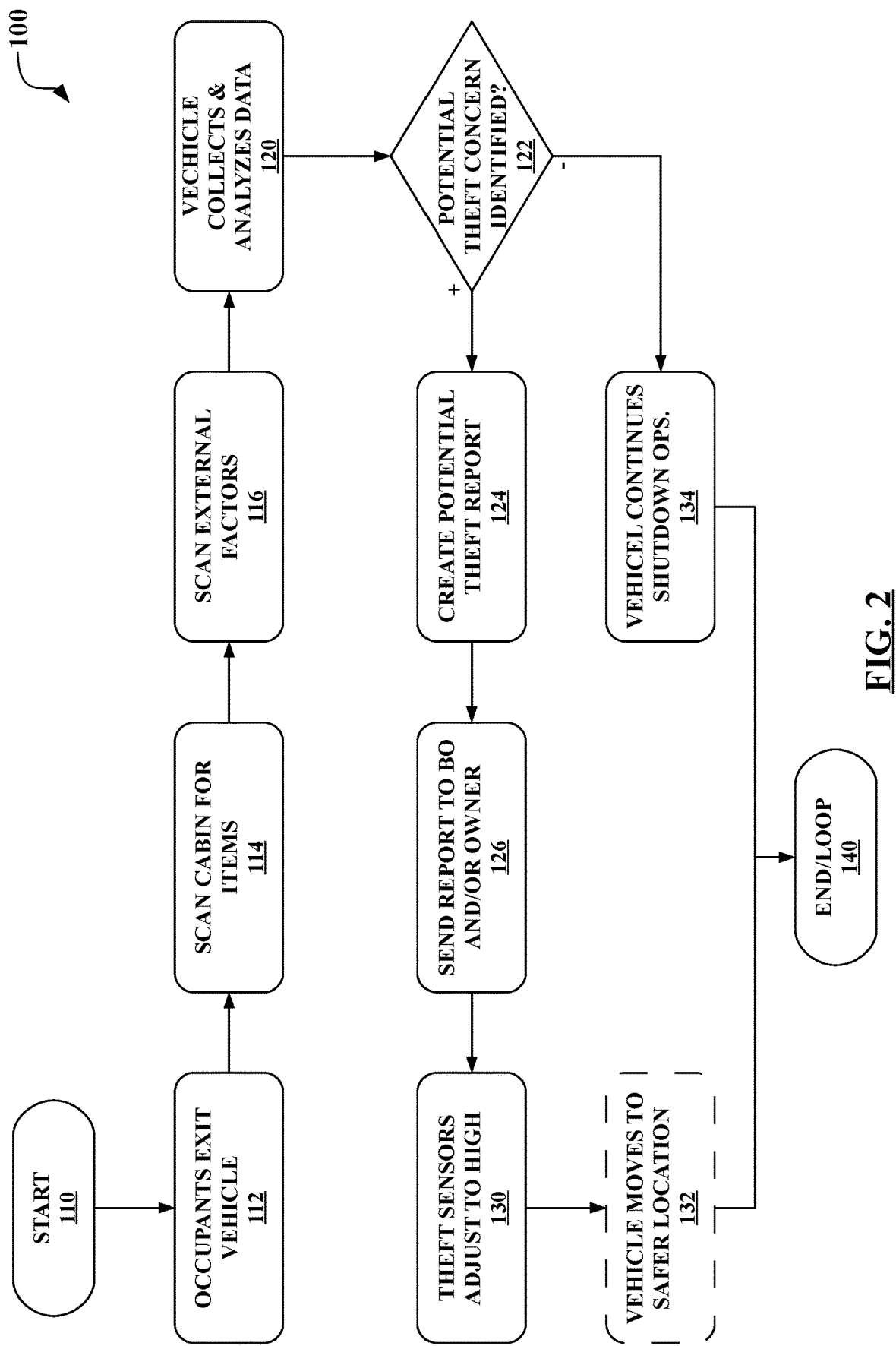
FIG. 2 is a schematic flow chart diagram of a method for proactive flow to automatically secure one or more vehicles.

FIG. 2 is a schematic flow chart diagram of a method 100 for proactive flow to automatically secure one or more vehicles 20. The proactive path includes elements that are generally automatically executed, irrespective of other factors. The proactive protection or pathway uses internal and external data elements to alert the owner, or user 30, via text or an app on the smart device 32 if they have higher odds of a potential theft due to parking and vehicle data.

One or more of the methods described herein may be executed by the controller, including the non-transitory computer-readable storage medium, or other structures or equipment recognizable to skilled artisans. All steps described herein may be optional, in addition to those explicitly stated as such, and all steps described may be reordered or removed. Any of the methods described herein may store the data in the centralized location 14.

Step 110: START. At step 110 the method 100 initializes or starts. Method 100 may begin operation when called upon by one or more controllers, may be constantly running, or may be looping iteratively.

Step 112: OCCUPANTS EXIT VEHICLE. At step 112, method 100 notes that the occupants, including the owners and/or the user 30, have exited the first vehicle 20.

Step 114: SCAN CABIN FOR ITEMS. At step 114, method 100 scans the cabin of the first vehicle 20 for items. These may be items of high theft value—including, without limitation, purses, wallets, or backpacks—or important items—including, without limitation, owner's manuals or mail with home or business addresses. For example, and without limitation, there may be a greater than 30-50% likelihood of theft based on high theft value items left in the cabin of the first vehicle 20. Additionally, and without limitation, high theft likelihood items left in the cabin may have a +3 score added to a weighted score.

Step 116: SCAN EXTERNAL FACTORS. At step 116, method 100 scans for external factors. These may include, without limitation, scanning the exterior of the first vehicle 20 for elements that contribute to high theft likelihood, such as darkened areas or high traffic areas. For example, and without limitation, there may be a greater than 30-50% likelihood of theft based on the area where the first vehicle 20 is parked.

Step 120: VEHICLE COLLECTS AND ANALYZES DATA. At step 120, method 100 collects and analyzes the data. Skilled artisans will recognize the data analysis to determine, without limitation, whether there are dangerous situations in the local area.

Step 122: POTENTIAL THEFT CONCERN IDENTIFIED? At step 122, method 100 determines whether the collected and analyzed data amounts to a potential theft concern. For example, and without limitation, if there is greater than 30% likelihood of theft based on high theft value items left in the first vehicle 20 and/or the area where the first vehicle 20 is parked.

Alternatively, and without limitation, there may be a score, or weighted score, applied, such that a "dark" area adds 2 to the score versus a "lit" area or add 3 to the score because the doors of the first vehicle 20 are unlocked. Then, as will be recognized by skill artisans, there may be a threshold score for determining that there are potential theft concerns. Note that this weighted score, or percentage assessments, may be used to determine whether there is a relatively higher risk of theft to the vehicle.

Step 124: CREATE POTENTIAL THEFT REPORT. At step 124, if method 100 determines that a potential theft concern has been identified, method 100 creates a potential theft report. The report may be sent including, without limitation, via text to the smart device 32 of the user 30, which may be the owner of the first vehicle 20.

Step 126: SEND REPORT TO BACK OFFICE AND/OR OWNER. At step 126, method 100 sends the report created in step 124 to the back office (BO), which may be part of the centralized location 14, and/or the owner of the first vehicle 20. Note that those having ordinary skill in the art will recognize additional destinations to which the report may be sent.

Step 130: THEFT SENSORS ADJUST TO HIGH. At step 130, method 100 adjusts the theft sensor to high levels for the vehicle. This includes, without limitation, changing thresholds or increasing sensitivity.

Step 132: VEHICLE MOVES TO SAFER LOCATION (OPTIONAL). At optional step 132, method 100 may move the vehicle to a safer location. Skilled artisans will recognize safer locations, which may include, without limitation: more lighted areas or areas with lower theft likelihood.

Step 134: VEHICLE CONTINUES SHUTDOWN OPERATIONS. At step 134, if step 122 determined that no potential threat was identified, the first vehicle 20, or other vehicles 20, continues its normal shutdown operations, which will be recognizable to skilled artisans.

Step 140: END/LOOP. At step 140, the method 100 ends or loops. Ending/looping may include proceeding back to start step 110 or waiting until called upon to run again.

Figure 3A:
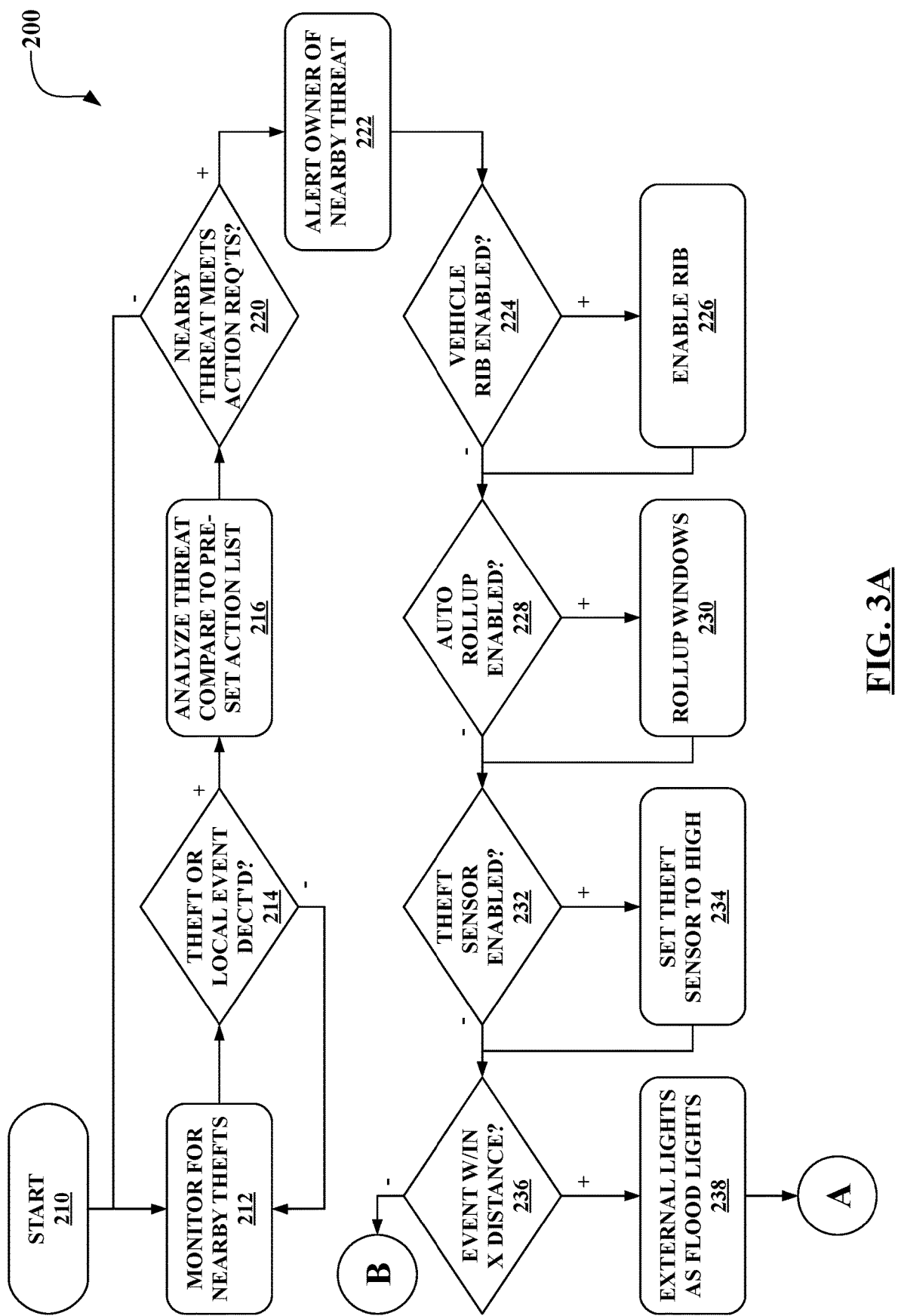
FIG. 3A and FIG. 3B are schematic flow chart diagrams of a method for reactive flow to automatically secure one or more vehicles.
Figure 3B:
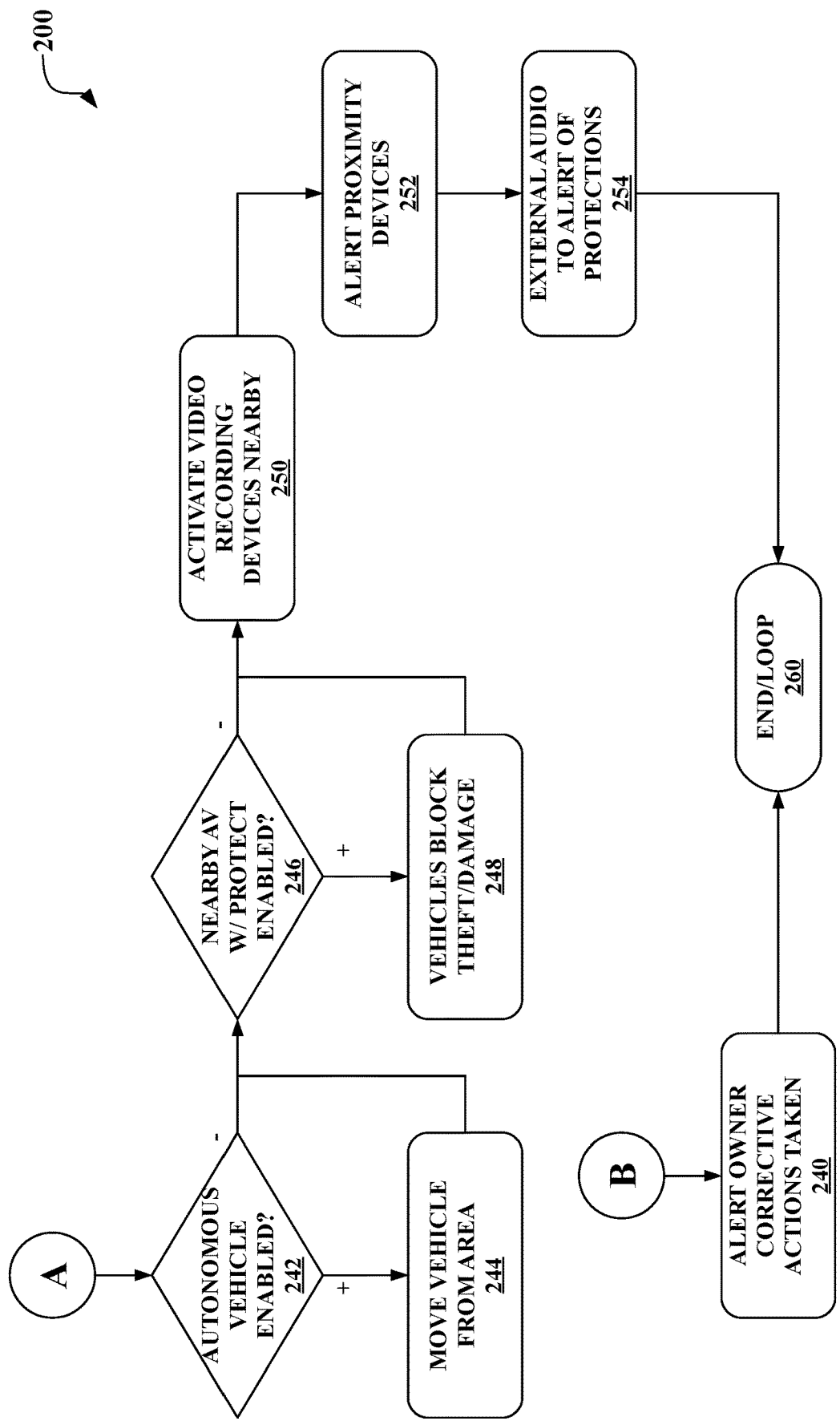

FIGS. 3A and 3B are schematic flow chart diagrams of a method 200 for reactive flow to automatically secure one or more vehicles 20. The reactive path include steps related to monitoring for possible issues. Note that method 200 may move back and forth between FIGS. 3A and 3B. The reactive pathway reacts to theft and local events to better protect the vehicle and belongings.

Step 210: START. At step 210 the method 200 initializes or starts. Method 200 may begin operation when called upon by one or more controllers, may be constantly running, or may be looping iteratively.

Step 212: MONITOR FOR NEARBY THEFTS. At step 212, method 200 monitors for thefts or other local events.

Step 214: THEFT OR LOCAL EVENT DETECTED? At step 214, method 200 determines whether there has been a theft, or another local event detected. This may include other local events, without limitation: thefts, civil unrest/riots, or other events recognized by skilled artisans.

If no threat or other events are detected, the method returns to monitoring for nearby thefts/events at step 212. Note that this may include a loop counter and/or may go back to the start step 210.

Step 216: ANALYZE THREAT AND COMPARE TO PRESET ACTION LIST. At step 216, method 200 analyzes the threat to determine whether the threat meets any of the items on a preset action list. Note that the preset action list may be customized by user 30 or by the back office, based on the type of situation determined to be occurring. The preset action list may include any of the items/actions described herein, in addition to others that will be recognized by those having ordinary skill in the art.

Step 220: THREAT MEETS ACTION REQUIREMENTS? At step 220, method 200 determines whether the threat meets remedial action requirements from the preset list. For example, and without limitation, if there is civil unrest in the area, there may be corrective actions that the vehicles 20 may be able to take.

If the threat does not meet action requirements, the method returns to monitoring for nearby thefts/events at step 212. Note that this may include a loop counter and/or may go back to the start step 210.

Step 222: ALERT OWNER OF NEARBY THREAT. At step 222, if step 220 determines that a threat meets the action requirements, an owner, which may be the user 30, is alerted to the nearby threat. At this point, the user 30 may choose from the available remedial actions or define others.

Step 224: REMOTE IGNITION BLOCK ENABLED? At step 224, method 200 checks whether the remote ignition block (RIB) is enabled. The RIB may be used to completely shut down the engine of the first vehicle 20.

Step 226: ENABLE RIB. At step 226, if one or more common routes are identified, method 200 adds that common route to the map and/or data.

Step 228: AUTO ROLLUP ENABLED? At step 228, method 200 determines whether auto rollup is enabled on the first vehicle 20. Auto rollup may allow the vehicle to roll its own windows up.

Step 230: ROLLUP WINDOWS. At step 230, if step 228 determines that auto rollup is enabled, method 200 rolls the windows of the first vehicle 20 up.

Step 232: THEFT SENSOR ENABLED? At step 232, method 200 determines whether there is a variable theft sensor on the first vehicle 20.

Step 234: THEFT SENSOR TO HIGH. At step 234, if step 232 determines that there is a variable theft sensor, method 200 sets the theft sensor to high and/or high alert. While the vehicle is in the armed state, external and internal data elements are constantly monitored to provide the best protection. If a theft is detected nearby the first vehicle 20, the system alerts the customer and takes predefined actions to increase vehicle safety.

Step 236: EVENT WITHIN PRESCRIBED (X) DISTANCE? At step 236, method 200 determines whether the event is within a prescribed (X) distance of the first vehicle 20. Skilled artisans will recognize the distances that would trigger alerts, based on the situation of the first vehicle 20 and the type of event occurring.

Step 238: EXTERNAL LIGHTS AS FLOOD LIGHTS. At step 238, if step 236 determines that the event is within the prescribed distance, method 200 activates many, if not all, of the external lights on the first vehicle 20 as flood lights, this includes, without limitation, headlights of the first vehicle 20 and other lights, which may also blink or flash to alert of possible theft. Note that this may also include activating audio elements, particularly if the theft sensor was set to high.

Step 240: ALERT OWNER CORRECTIVE ACTIONS TAKEN. At step 240, if step 236 determines that the event is not within the prescribed distance, method 200 alerts the owner of the first vehicle 20 that corrective, hopefully successful, actions have been taken.

Step 242: AUTONOMOUS VEHICLE ENABLED? At step 242, method 200 determines whether the first vehicle 20 has autonomous capabilities. Autonomous vehicles (AVs)

are vehicles that control their own operation and either require reduced input from a human driver, or do not need a human driver at all.

Step 244: MOVE VEHICLE FROM AREA. At step 244, if step 242 determines that the first vehicle 20 has autonomous capabilities, method 200 moves the first vehicle 20 to a different, likely safer, area.

Step 246: NEARBY AV WITH PROTECT MODE ENABLED? At step 246, method 200 determines whether there are nearby vehicles, such as the second vehicle 22 and the third vehicle 24, are AV vehicles and have protect mode enabled. Protect mode may allow the nearby vehicles to move to block the first vehicle 20.

Step 248: ONE OR MORE VEHICLES BLOCK THEFT/DAMAGE. At step 248, if step 242 determines that there are nearby AV vehicles with protect mode enabled, method 200 uses one or more of those vehicles to block the first vehicle 20 and prevent possible theft and/or damage.

Step 250: ACTIVATE VIDEO RECORDING DEVICES NEARBY. At step 250, method 200 activates any nearby recording devices. For example, and without limitation, video doorbells or security cameras may be requested to initiate recording or to turn on sensors that initiate recording. This may occur via several communication paths including, without limitation, vehicle to anything (V2X) or through the centralized location 14 and Wi-Fi communications or capabilities, as will be recognized by those having ordinary skill in the art. V2X may communicate with nearby elements, including, without limitation: nearby vehicles, nearby communications systems, or others recognizable to those having ordinary skill in the art. V2X may include, without limitation, short range wireless, long range wireless, Bluetooth, Wi-Fi, or others recognizable to those having ordinary skill in the art.

Step 252: ALERT PROXIMITY DEVICES. At step 252, method 200 activates any proximity devices nearby. For example, and without limitation: smart doors, smart locks, security systems, and smart garage doors may be alerted to lock themselves, arm themselves, and/or close. This may occur via several communication paths including, without limitation: V2X or through the centralized location 14 and Wi-Fi communications or capabilities, as will be recognized by those having ordinary skill in the art.

Step 254: EXTERNAL AUDIO TO ALERT OF PROTECTIONS. At step 254, method 200 uses external audio to alert that the first vehicle 20 has protections enabled. For example, and without limitation: horns and/or alarms may sound, or nearby security systems may make alert noises.

Step 260: END/LOOP. At step 260, the method 200 ends or loops. The end/loop step 260 may then proceed, if necessary, back to the start step 210 or waiting until called upon to run again.

Results of methods 100 and 200 may be shared with first responders, such as, without limitation, including police and fire departments, or cities, to promote public safety and/or data collection. Theft data or civil unrest data may be shared with similar authorities.

The detailed description and the drawings or figures are supportive and descriptive of the subject matter herein. While some of the best modes and other embodiments have been described in detail, various alternative designs, embodiments, and configurations exist.

Furthermore, any examples shown in the drawings or the characteristics of various examples mentioned in the present description are not necessarily to be understood as examples independent of each other. Rather, it is possible that each of the characteristics described in one of the examples of an embodiment can be combined with one or a plurality of other desired characteristics from other examples, resulting in other examples not described in words or by reference to the drawings. Accordingly, such other examples fall within the framework of the scope of the appended claims.

The invention claimed is:

1. A method of securing a vehicle via computer processing, comprising:
monitoring local events;
determining whether the vehicle is parked in a dangerous area;
determining whether valuable items have been left in view; and
notifying a user of the vehicle if valuable items have been left in view via wireless communications.

2. The method of claim 1, further comprising:
determining whether local events have occurred within a prescribed distance of the vehicle.

3. The method of claim 2, further comprising:
if the local events have occurred within the prescribed distance, arming one or more security features of the vehicle.

4. The method of claim 3, wherein arming one or more security features of the vehicle includes:
locking doors of the vehicle; and
monitoring external and internal data elements.

5. The method of claim 4, further comprising:
using V2X to communicate with nearby elements.

6. The method of claim 5, further comprising:
self-driving the vehicle to a safer area.

7. The method of claim 6, further comprising:
if the vehicle determines that a theft is occurring on the vehicle, using nearby self-driving vehicles to block the vehicle in.

8. The method of claim 7, wherein the nearby self-driving vehicles are reached via V2X or a back office asking the nearby self-driving vehicles to block the vehicle in.

9. A non-transitory computer-readable storage medium on which is recorded instructions, wherein execution of the instructions by a processor causes the processor to:
monitor local events;
determine whether a vehicle is parked in a dangerous area;
determine whether valuable items have been left in view; and
notify a user of the vehicle if valuable items have been left in view.

10. The non-transitory computer-readable storage medium on which is recorded instructions of claim 9, wherein execution of the instructions by the processor causes the processor to:
determine whether local events have occurred within a prescribed distance; and
if the local events have occurred within the prescribed distance, then executing at least one of arming one or more security features of the vehicle and taking corrective action to protect the vehicle.

11. The non-transitory computer-readable storage medium on which is recorded instructions of claim 10, wherein:
arming one or more security features of the vehicle includes at least one of locking doors of the vehicle and setting theft sensors to high; and
taking corrective action includes at least one of rolling up windows, disabling an engine and turning on headlights.

12. The non-transitory computer-readable storage medium on which is recorded instructions of claim 9, wherein execution of the instructions by the processor causes the processor to:
  self-drive the vehicle to move itself to a safer area if:
    valuable items are found during scanning, and/or
    external factors make theft of the vehicle more likely.

13. The non-transitory computer-readable storage medium on which is recorded instructions of claim 9, wherein execution of the instructions by the processor causes the processor to:
  create a proactive pathway, including:
    scanning a cabin of the vehicle for items that are high theft likelihood, including greater than 30 percent chance of theft or a score exceeds a threshold; and
    scanning for external factors that make theft of the vehicle more likely; and/or
  create a reactive pathway, including:
    monitoring for thefts in the area; and
    using a preset action list when it is determined that there are thefts in the area.

14. The non-transitory computer-readable storage medium on which is recorded instructions of claim 13, wherein execution of the instructions by the processor causes the processor to:
  monitor for civil unrest in the area; and
  self-drive the vehicle to move itself to a safer area if thefts or civil unrest are occurring.

15. The non-transitory computer-readable storage medium on which is recorded instructions of claim 13,
  wherein the proactive pathway further includes sending a report of potential theft concerns to at least one of a back office and a user of the vehicle, and
  setting theft sensors to high or self-driving the vehicle to move itself to a safer area.

16. A method of securing a vehicle via a controller, comprising:
  monitoring local events;
  determining whether the vehicle is parked in a dangerous area;
  determining whether valuable items have been left in view; and
  if valuable items have been left in view, then notifying a user of the vehicle and executing at least one of:
    arming one or more security features of the vehicle, and
    taking corrective action to protect the vehicle.

17. The method of claim 16, wherein arming one or more security features includes at least one of locking doors of the vehicle and setting theft sensors to high, and wherein taking corrective action includes at least one of rolling up windows, disabling an engine, and turning on headlights.

18. The method of claim 16, further comprising:
  determining whether local events have occurred within a prescribed distance of the vehicle.

19. The method of claim 18, further comprising:
  if local events have occurred within the prescribed distance, then self-driving the vehicle to move itself to a safer area.

20. The method of claim 18, further comprising:
  if local events have occurred within the prescribed distance, then using nearby self-driving vehicles to block the vehicle in.

\* \* \* \* \*